(12) United States Patent
Winter et al.

(10) Patent No.: US 12,057,778 B2
(45) Date of Patent: Aug. 6, 2024

(54) DRIVE METHOD FOR A DC-DC VOLTAGE CONVERTER, AND DC-DC VOLTAGE CONVERTER

(71) Applicant: Robert Bosch GmbH, Stuttgart (DE)

(72) Inventors: Christian Winter, Tamm (DE); Jan Riedel, Esslingen am Neckar (DE)

(73) Assignee: Robert Bosch GmbH, Stuttgart (DE)

(*) Notice: Subject to any disclaimer, the term of this patent is extended or adjusted under 35 U.S.C. 154(b) by 284 days.

(21) Appl. No.: 17/637,663

(22) PCT Filed: Aug. 10, 2020

(86) PCT No.: PCT/EP2020/072368
§ 371 (c)(1),
(2) Date: Feb. 23, 2022

(87) PCT Pub. No.: WO2021/037537
PCT Pub. Date: Mar. 4, 2021

(65) Prior Publication Data
US 2022/0278623 A1   Sep. 1, 2022

(30) Foreign Application Priority Data
Aug. 28, 2019  (DE) .................... 10 2019 212 887.4

(51) Int. Cl.
*H02M 3/335* (2006.01)
*H02M 1/00* (2006.01)
(52) U.S. Cl.
CPC ..... *H02M 3/33576* (2013.01); *H02M 1/0058* (2021.05); *H02M 3/33573* (2021.05)
(58) Field of Classification Search
CPC ............. H02M 3/335; H02M 3/33576; H02M 3/33573; H02M 1/0058
See application file for complete search history.

(56) References Cited

U.S. PATENT DOCUMENTS

| 9,837,908 B2* | 12/2017 | Suetomi ............ H02M 3/33584 |
| 2015/0214847 A1 | 7/2015 | Shimada et al. |
| 2018/0183345 A1 | 6/2018 | Itoh et al. |

FOREIGN PATENT DOCUMENTS

| DE | 102016200662 A1 | 7/2017 |
| JP | 2018133964 A | 8/2018 |

OTHER PUBLICATIONS

Translation of International Search Report For Application No. PCT/EP2020/072368 dated Oct. 5, 2020 (2 pages).

* cited by examiner

*Primary Examiner* — Gary L Laxton
(74) *Attorney, Agent, or Firm* — Michael Best & Friedrich LLP

(57) ABSTRACT

Examples provide a system and method for driving a DC-DC voltage with a primary-side full bridge and a transformer arranged between the primary-side full bridge and a secondary side of the DC-DC voltage converter. A first diagonal branch and a second diagonal branch are driven alternately. In a first switching sequence between driving the first diagonal branch and driving the second diagonal branch, the connecting elements of a primary side of the transformer are electrically connected to one another using the upper switching elements of the primary-side full bridge. In a second switching sequence between driving the first diagonal branch and driving the second diagonal branch, the connecting elements of the primary side of the transformer are electrically connected to one another using the lower switching elements of the primary-side full bridge. The primary-side full bridge is driven alternately according to the first switching sequence and the second switching sequence.

6 Claims, 4 Drawing Sheets

DRIVE METHOD FOR A DC-DC VOLTAGE CONVERTER, AND DC-DC VOLTAGE CONVERTER

BACKGROUND OF THE INVENTION

The present invention relates to a method for driving a DC-DC voltage converter. Furthermore, the present invention relates to a DC-DC voltage converter, in particular a phase-shifted full-bridge DC-DC voltage converter.

DC-DC voltage converters are known for converting a first DC voltage into a second DC voltage with a different voltage level. In particular, the group of the DC-DC voltage converter also comprises so called phase-shifted full-bridge DC-DC voltage converters. Under certain conditions, these DC-DC voltage converters can also realize a power transfer from the secondary side to the primary side, provided that active switching elements are also used on the secondary side. For example, DC-DC voltage converters can be used in order to couple a high-voltage network of an electric vehicle with the low-voltage network of the vehicle and to transmit electrical energy between the two on-board power supplies of an electric vehicle of this type.

Printed document DE 10 2016 200 662 A1 discloses a bidirectional DC-DC voltage converter for energy transmission between a high-voltage network and a low-voltage network of an electric vehicle. The converter comprises at least one transformer for galvanic isolation of the two on-board power supplies, electronic switches to reverse the polarity of the windings of the transformer as well as a control device for controlling the switches. In particular, the DC-DC voltage converter is intended to enable charging of an intermediate circuit capacitor on the high-voltage side.

SUMMARY OF THE INVENTION

The present invention discloses a method for driving a DC-DC voltage converter as well as a DC-DC voltage converter with the features of the independent claims. Further embodiments are the subject matter of the dependent claims.

Accordingly, provision is made for the following:

A method for driving a DC-DC voltage converter. The DC-DC voltage converter comprises a primary-side full bridge and a transformer. The transformer is arranged between the primary-side full bridge and a secondary side of the DC-DC voltage converter. The method for driving the DC-DC voltage converter alternately drives a first diagonal branch and a second diagonal branch of the primary-side full bridge. In this case, the first diagonal branch is complementary to the second diagonal branch of the primary-side full bridge. In this case, the switching elements of the full bridge can be driven alternately according to a first switching sequence and a second switching sequence. In the first switching sequence, between driving the first diagonal branch and driving the second diagonal branch of the primary-side full bridge, a primary side of the transformer is short-circuited by means of the upper switching elements of the primary-side full bridge. In the second switching sequence, a short-circuiting of the primary side of the transformer takes place between driving the first diagonal branch and driving the second diagonal branch of the primary-side full bridge by means of the lower switching elements of the primary-side full bridge. Moreover, the primary side of the transformer can also be short-circuited by means of the upper switching elements or the lower switching elements between driving the second diagonal branch and driving the first diagonal branch.

Provision is further made for the following:

A DC-DC voltage converter, in particular a phase-shifted full-bridge DC-DC voltage converter, with a primary-side full bridge and a transformer. The transformer can be arranged between the primary-side full bridge and a secondary side of the DC-DC voltage converter. The primary-side full bridge can be arranged between a primary-side DC voltage connection of the DC-DC voltage converter and a primary side of the transformer. Moreover, the DC-DC voltage converter comprises a control device. The control device can be designed to drive the switching elements of the primary-side full bridge as claimed in the method according to the invention.

The present invention is based on the knowledge that in the case of conventional driving of a DC-DC voltage converter, such as a phase-shifted full-bridge DC-DC voltage converter, for example, the switching elements in the primary-side full bridge are driven according to a fixed predetermined switching sequence. In this case, the switching elements of a half bridge of the full bridge usually have to be hard-switched, i.e. there is a significant voltage drop across the switching element during the switching-on process. In contrast, the switching elements of the other half bridge can optionally be soft-switched, i.e. there is not a significant voltage drop across the switching element during the switching-on process. Since a hard switching process usually results in higher losses, the switching elements which have to be hard-switched are more heavily loaded and thus these switching elements heat up more than the switching elements which are merely soft-switched. On the one hand, this results in an uneven stress on the switching elements involved. Moreover, the maximum power limit of the DC-DC voltage converter is limited by the most heavily stressed components. As a result, a power limitation may occur in the method described above based on the losses at the hard-switched switching elements.

One idea for the present invention is therefore to take this knowledge into account and to provide a DC-DC voltage converter as well as a method for operating a DC-DC voltage converter, which can enable more even stress on the components, in particular the switching elements in the primary-side full bridge. For this purpose, provision is made to modify the switching sequence for driving the switching elements in the primary-side full bridge. In particular, the modified switching sequence makes it possible for the same switching elements to not always be operated in a hard-switching or soft-switching manner. By switching between hard switching processes and soft switching processes for the individual switching elements, the stress and the resulting power dissipation can thereby be distributed evenly across all switching elements involved. This creates more even stress on and heating of all switching elements in the primary-side full bridge of the DC-DC voltage converter.

The even distribution of the power dissipation to the individual switching elements makes it possible to also use switching elements with higher switch-on losses, if applicable. Furthermore, the design of the cooling system is also less critical.

According to one embodiment, in the first switching sequence between driving the second diagonal branch and driving the first diagonal branch in the primary-side full bridge, an electrical connection of the connecting elements of the primary side of the transformer takes place by means of the lower switching elements of the primary-side full bridge. Analogously, in the second switching sequence between driving the second diagonal branch and driving the first diagonal branch in the primary-side full bridge, an electrical connection of the connecting elements on the primary side of the transformer takes place by means of the upper switching elements of the primary-side full bridge. In this way, an electrical connection of the connecting elements of the primary side of the transformer takes place in each case between each driving of a diagonal branch in the primary-side full bridge. In other words, a primary-side short circuit of the transformer takes place via the upper or the lower switching elements of the primary-side full bridge between two driving operations of diagonal branches in the primary-side full bridge.

According to one embodiment, the switch between the first switching sequence and the second switching sequence takes place after a predetermined number of switching cycles. A switching cycle can be considered to be driving a diagonal branch in each case, for example. Alternatively, a switching cycle can also be considered to be driving firstly a first diagonal branch and subsequently the second diagonal branch in each case. Alternatively, the switch between the switching sequence and the second switching sequence can also take place after predetermined time intervals or any other criteria. For example, a temperature at one or a plurality of switching elements of the first full bridge can also be monitored and, when a predetermined limit temperature is reached, a switch can take place between the first and the second switching sequence. Of course, the switch from the second switching sequence back to the first switching sequence can also take place according to the same or corresponding criteria.

According to one embodiment, in the method for driving the DC-DC voltage converter, the DC-DC voltage converter is driven in a discontinuous conduction mode (DCM). In this operation mode, during a predetermined time period, electrical energy is fed into the transformer via a diagonal branch of the primary-side DC-DC voltage converter, such that a rising electrical current is set up in the transformer. Consequently, the primary side of the transformer is short-circuited and the electrical current in the transformer drops to 0 amperes. In the further course, this process is repeated by driving the complementary diagonal branch in the primary-side full bridge with the opposite sign.

The primary-side full bridge can comprise a first half bridge and a second half bridge. In this case, the first half bridge can comprise a first upper switching element and a first lower switching element. Analogously, the second half bridge can comprise a second upper switching element and a second lower switching element. The first upper switching element can be arranged between a first connecting element of the primary-side DC voltage connection and a first nodal point. The first lower switching element can be arranged between the first nodal point and a second connection of the primary-side DC voltage connection. Analogously, the second upper switching element can be arranged between the first connecting element of the primary-side DC voltage connection and a second nodal point. The second lower switching element can be arranged between the second nodal point and the second connecting element of the primary-side DC voltage connection. Furthermore, the first nodal point can be connected to a first connecting element of the primary side of the transformer and the second nodal point can be connected to a second connecting element of the primary side of the transformer. The first upper switching element and the second lower switching element thus form a first diagonal branch. Analogously, the second upper switching element and the first lower switching element form a second diagonal branch which is complementary to the first diagonal branch.

The above configurations and developments can be freely combined with one another, as far as is reasonable. Further configurations, developments and implementations of the invention also include combinations, not explicitly mentioned, of features of the invention described previously or hereinafter with respect to the exemplary embodiments. In this case, the person skilled in the art shall in particular also add individual aspects as improvements or supplements to the respective basic forms of the invention.

BRIEF DESCRIPTION OF THE DRAWINGS

Further features and advantages of the invention are explained hereinafter using the figures. In the figures.

DETAILED DESCRIPTION

Figure 1:
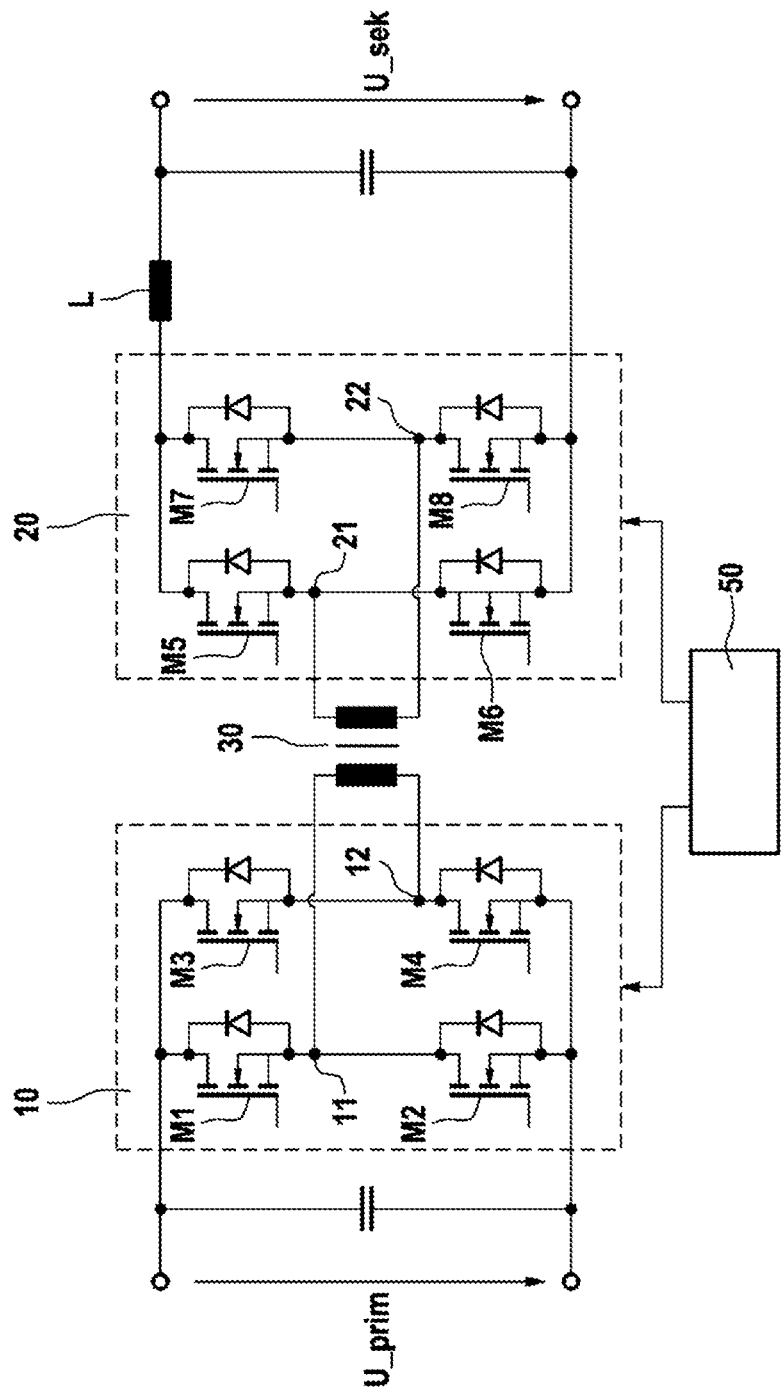
FIG. 1: shows a schematic representation of a block diagram as it is based on a DC-DC voltage converter according to one embodiment.

FIG. 1 shows a schematic representation of a block diagram as it is based on a DC-DC voltage converter 1 according to one embodiment. The DC-DC voltage converter 1 can be a phase-shifted full-bridge DC-DC voltage converter, for example. The DC-DC voltage converter comprises a primary-side full bridge 10 as well as a secondary-side full bridge 20. A transformer 30 is arranged between the primary-side full bridge 10 and the secondary-side full bridge 20. In principle, it is also possible to provide a passive rectifier instead of the secondary-side full bridge 20, for example by means of four diodes. The switching elements M1 to M4 of the primary-side full bridge 10 as well as optionally the switching elements M5 to M8 of the secondary-side full bridge 20 can be driven by means of the control device 50, for example.

The full bridge 10 comprises two half bridges with two switching elements in each case. In a first half bridge, a first switching element M1 can be arranged between a first input connection on the primary side of the DC-DC voltage converter and a first nodal point 11. A second switching element M2 can be arranged between the first nodal point 11 and a second input connection on the primary side of the DC-DC voltage converter 1. Analogously, in the second half bridge, a third switching element M3 can be provided between the first connecting element on the primary side of the DC-DC voltage converter 1 and a second nodal point 12. A fourth switching element M4 can be arranged between the second nodal point 12 and the second input connection on the primary side of the DC-DC voltage converter. The first nodal point 11 can be connected to a first connection of the primary side of the transformer 30. Analogously, the second nodal point 12 can be connected to a second connection on the primary side of the transformer 30. Provided that the DC-DC voltage converter 1 also has a full bridge 20 on the secondary side, it can, analogous to the primary-side full bridge 10, be structured between the secondary side of the transformer 30 and the secondary-side connection of the DC-DC voltage converter 1. A capacitor can be provided in each case between the two connecting elements of the primary-side connection and/or between the two connecting elements of the secondary-side connection of the DC-DC voltage converter 1. Moreover, a series inductance L can be provided between the secondary-side full bridge 20 and a connecting element on the secondary side of the DC-DC voltage converter 1.

The first switching element M1 of the first half bridge thus forms a first upper switching element. The second switching element M2 of the first half bridge thus forms a first lower switching element. The third switching element M3 of the second half bridge forms a second upper switching element, and the fourth switching element M4 of the second half bridge forms a second lower switching element. The first upper switching element M1 and the second lower switching element M4 thus form a first diagonal branch. Analogously, the second upper switching element M3 and the first lower switching element M2 form a second diagonal branch which is complementary to the first diagonal branch.

Different switching states are described in subsequent FIGS. 2 to 5, as they can be set by means of the primary-side full bridge 10.

Figure 2:
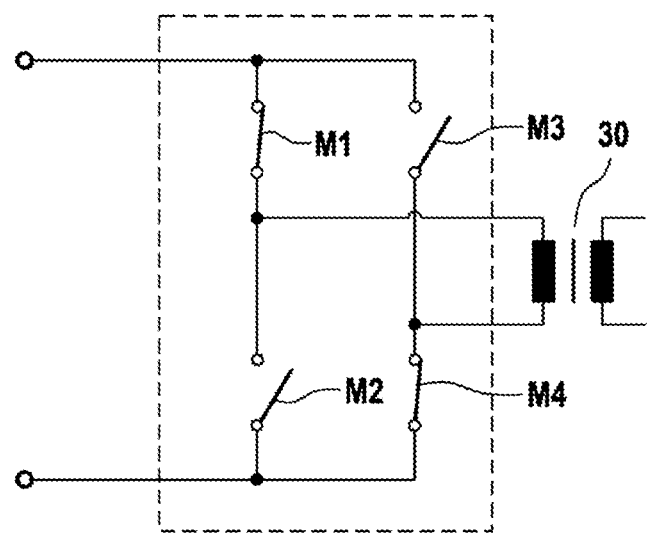
FIGS. 2-5: show block diagrams in each case of different switching states while driving a DC-DC voltage converter according to one embodiment.

FIG. 2 shows a schematic representation of the primary-side full bridge 10 in the case of which the switching elements M1 and M4 of a first diagonal branch are driven. Accordingly, an electrical current can flow from the first connecting element of the primary-side connection via the first switching element M1 and the primary side of the transformer 30, as well as the second lower switching element M4 to the second connecting element of the primary-side connection of the DC-DC voltage converter 1. This results in a rising electrical current being set up in the transformer 30.

Figure 3:
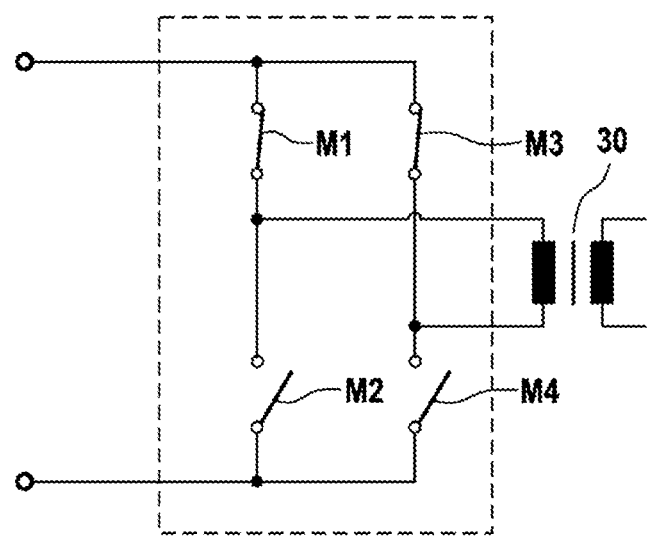

FIG. 3 shows a switching state of the primary-side full bridge 10 in the case of which the two upper switching elements M1 and M3 are closed and the two lower switching elements M2 and M4 are open. In this switching state, the two connecting elements of the primary side of the transformer 30 are electrically connected to one another via the two upper switching elements M1 and M3 and thus the primary side of the transformer 30 is short-circuited. In this switching state, an electrical current set up in the transformer 30 can continuously decay down to 0 amperes.

Figure 4:
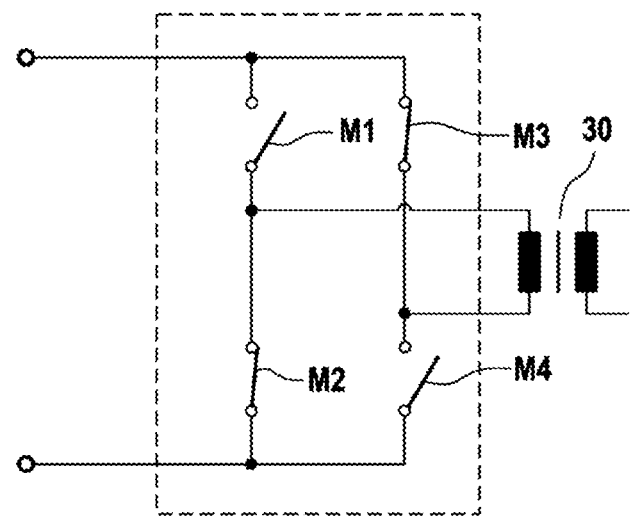

FIG. 4 shows the switching state of the primary-side full bridge 10 in the case of which the second diagonal branch made up of the first lower switching element M2 and the second upper switching element M3 is closed. Accordingly, in this switching state, the second diagonal branch which is complementary to the diagonal branch according to FIG. 2 is driven. An electrical current can therefore build up in the transformer 30, the flow direction of which is opposite to the flow direction of the electrical current according to FIG. 2.

Figure 5:
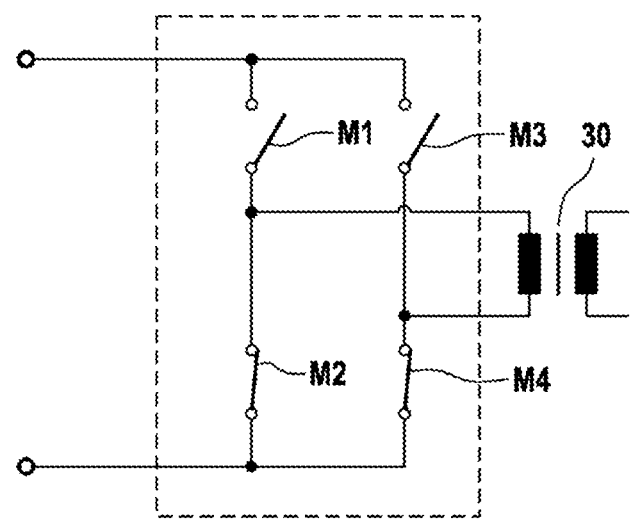

Finally, FIG. 5 represents a switching state in the case of which the two lower switching elements M2 and M4 are closed and the two upper switching elements M1 and M3 are open. Accordingly, the primary side of the transformer 30 is short-circuited via the two lower switching elements M2 and M4. An electrical current can thus flow via the two lower switching elements M2 and M4, until the electrical current in the transformer 30 has decayed to 0 amperes.

For the subsequent explanation, the switching state according to FIG. 2 is referred to as switching state 1, the switching state according to FIG. 3 as switching state 2, the switching state according to FIG. 4 as switching state 3 and the switching state according to FIG. 5 as switching state 4.

For transmitting electrical energy from the primary side to the secondary side of the DC-DC voltage converter 1, an electrical current with alternating positive and negative flow direction can be periodically impressed into the transformer 30 through a sequence of the switching states 1-2-3-4-1-2-3-4 . . . , for example. In this case, when switching on the first upper switching element M1 for switching state 1 as well as when closing the first lower switching element M2 for the third switching state 3, the full primary-side input voltage U_prim is applied across the respective switching element M1, M2 in each case. The switching elements M1, M2 of the first half bridge therefore have to be hard-switched. In contrast, when closing the switching elements M3 and M4 of the second half bridge, a significantly lower electrical voltage is applied across the switching elements M3, M4 in each case, such that these switching elements can be soft-switched in each case. If the DC-DC voltage converter 1 was therefore always constantly driven with the above described switching sequence 1-2-3-4, the losses at the switching elements M1, M2 of the first half bridge would be higher than the losses over the two switching elements M3, M4 of the second half bridge.

In contrast, if the DC-DC voltage converter 1 is driven with an alternative switching sequence 1-4-3-2-1-4-3-2 . . . , the switching elements M3 and M4 of the second half bridge are hard-switched in this switching sequence, while the switching elements M1, M2 of the first half bridge are soft-switched. In this case, a high power dissipation is created at the switching elements M3 and M4 of the second half bridge than at the switching elements M1 and M2 of the first half bridge.

In order to achieve as even a distribution of the losses in the first full bridge 10 as possible, it is therefore possible to switch between the two switching sequences described previously. For example, it is possible to regularly switch between the first switching sequence (1-2-3-4) and the second switching sequence (1-4-3-2) after a predetermined number of switching processes. Of course, any other specifications for a regular switch between the two switching sequences are also possible. It is therefore possible to switch between the two switching sequences after predetermined time intervals in each case, for example. Alternatively, the temperature at the switching elements can also be monitored, for example. For this purpose, temperature sensors or temperature models may be considered for calculating the temperatures, for example. If the temperatures of the switching elements at a half bridge exceed a predetermined threshold value, it is possible to subsequently switch to the alternative switching sequence, for example, in order to relieve the corresponding switching elements. Of course, any other schemes are also possible for the switch between the switching sequences.

Figure 6:
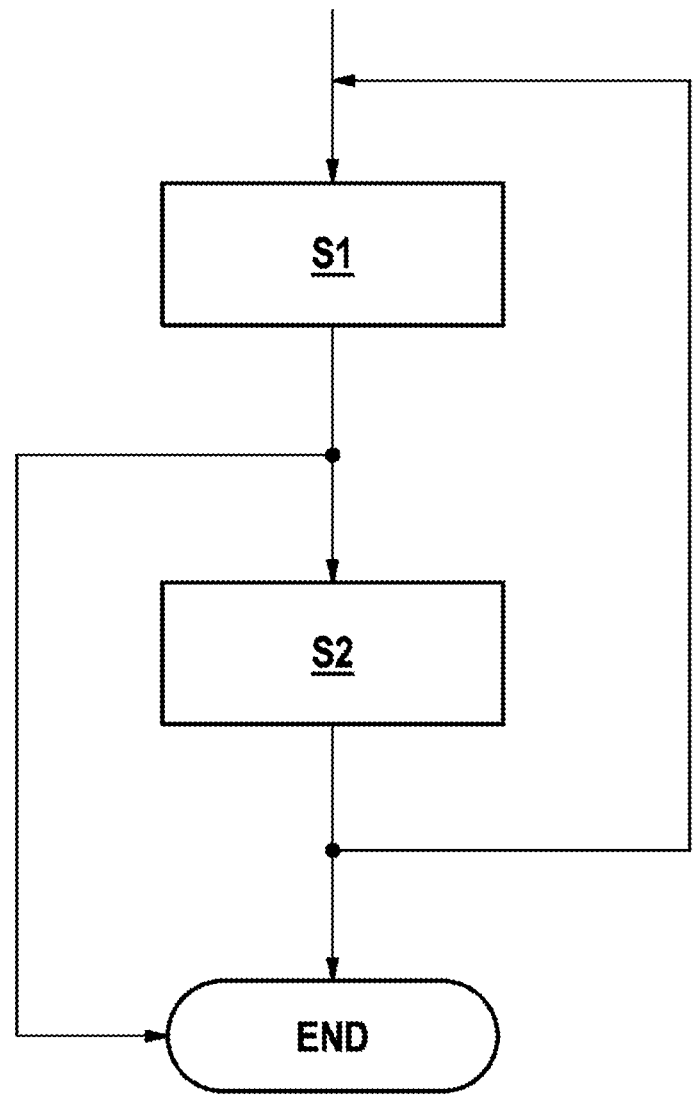
FIG. 6: shows a schematic representation of a flow diagram as it is based on a method for driving a DC-DC voltage converter according to one embodiment.

FIG. 6 shows a schematic representation of a flow diagram as it is based on a method for driving a DC-DC voltage converter according to one embodiment. All statements made previously in the context of the DC-DC voltage converter 1 apply to this method. Moreover, the DC-DC voltage converter 1 described previously can correspondingly also be designed in order to carry out all of the subsequent steps in the context of the method.

In a first step S1, the DC-DC voltage converter can be driven with a first switching sequence. In this first switching sequence, the first diagonal branch and the second diagonal branch are driven alternately. An electrical connection of the two connections of the primary side of the transformer takes place therebetween in each case either via the upper switching elements M1, M3 or the lower switching elements M2, M4. In the first switching sequence, as described previously by way of the switching sequence 1-2-3-4, for example, a first diagonal branch, for example made up of the first upper switching element M1 and the second lower switching element M2, can be driven first. The two upper switching elements M1 and M3 can subsequently be driven in switching state 2. The second diagonal branch made up of the second upper switching element M3 and the first lower switching element M2 can subsequently be driven. Finally, the two lower switching elements M2 and M4 are driven. The first diagonal branch can subsequently be driven again according to the first switching state 1.

In a second switching sequence S2, the switch between the first diagonal branch and the second diagonal branch takes place by driving the two lower switching elements M2 and M4. Accordingly, the switch between the second diagonal branch to the first diagonal branch takes place by driving the two upper switching elements M1 and M3.

In this case, it is possible to regularly switch, for example periodically, between the first switching sequence in step S1 and the second switching sequence in step S2. As already described previously, any schemes are possible for this purpose, for example a switch on a predetermined number of switching processes, after a predetermined time span, or the like.

In particular, the DC-DC voltage converter can be operated in a discontinuous conduction mode (DCM).

To summarize, the present invention relates to the driving of a DC-DC voltage converter, such as a phase-shifted full-bridge DC-DC voltage converter, for example, wherein it is possible to switch between two predetermined switching sequences. In this way, an even stress on the switching elements of a primary-side full bridge of the DC-DC voltage converter can be achieved. This makes it possible for the switching elements of a first half bridge of the primary-side full bridge to be hard-switched in the first switching sequence, for example, while the switching elements of a second half bridge of the primary-side full bridge are hard-switched in the second switching sequence.

The invention claimed is:

1. A method for driving a DC-DC voltage converter (1) with a primary-side full bridge (10) and a transformer (30) which is arranged between the primary-side full bridge (10) and a secondary side of the DC-DC voltage converter (1), the method comprising:
    alternately driving a first diagonal branch and a second diagonal branch on the primary side, the first diagonal branch being complementary to the second diagonal branch;
    wherein a first switching state includes driving the first diagonal branch,
    a second switching state includes electrically connecting connecting elements of a primary side of the transformer (30) to one another by means of upper switching elements (M1, M3) of the primary-side full bridge (10),
    a third switching state includes driving the second diagonal branch,
    a fourth switching state includes electrically connecting connecting elements of the primary side of the transformer (30) to one another by means of lower switching elements (M2, M4) of the primary-side full bridge (10), and
    the primary-side full bridge (10) is driven alternately according to a first switching sequence (S1) and a second switching sequence (S2), the first switching sequence (S1) having a sequence of the first, second, and third switching states, and the second switching sequence (S2) having a sequence of the first, fourth, and third switching states.

2. The method as claimed in claim 1, wherein the switch between the first switching sequence (S1) and the second switching sequence (S2) takes place after a predetermined number of switching cycles.

3. The method as claimed in claim 1, wherein the DC-DC voltage converter (1) is driven in a discontinuous conduction mode.

4. A DC-DC voltage converter (1), comprising:
    a primary-side full bridge (10), and
    a transformer (30) which is arranged between the primary-side full bridge (10) and a secondary side of the DC-DC voltage converter (1),
    wherein the primary-side full bridge (10) is arranged between a primary-side DC voltage connection and a primary side of the transformer (30), and
    wherein the DC-DC voltage converter (1) comprises a control device (50) which is configured to:
    drive a first diagonal branch and a second diagonal branch alternately,
    wherein a first switching state includes driving the first diagonal branch,
    a second switching state includes electrically connecting connecting elements of a primary side of the transformer (30) to one another by means of upper switching elements (M1, M3) of the primary-side full bridge (10),
    a third switching state includes driving the second diagonal branch,
    a fourth switching state includes electrically connecting connecting elements of the primary side of the transformer (30) to one another by means of lower switching elements (M2, M4) of the primary-side full bridge (10), and
    the primary-side full bridge (10) is driven alternately according to a first switching sequence (S1) and a second switching sequence (S2), the first switching sequence (S1) having a sequence of the first, second, and third switching states, and the second switching sequence (S2) having a sequence of the first, fourth, and third switching states.

5. The DC-DC voltage converter (1) as claimed in claim 4, wherein the primary-side full bridge (10) comprises a first half bridge and a second half bridge,
    wherein the first half bridge comprises a first upper switching element (M1) and a first lower switching element (M2), and the second half bridge comprises a second upper switching element (M3) and a second lower switching element (M4),
    wherein the first upper switching element (M1) is arranged between a first connecting element of the primary-side DC voltage connection and a first nodal point (11), and the first lower switching element (M2) is arranged between the first nodal point (11) and a second connecting element of the primary-side DC voltage connection,
    wherein the second upper switching element (M3) is arranged between the first connecting element of the primary-side DC voltage connection and a second nodal point (12), and the second lower switching element (M4) is arranged between the second nodal point (12) and the second connecting element of the primary-side DC voltage connection, and
    wherein the first nodal point (11) is connected to a first connecting element of the primary side of the transformer (30), and the second nodal point (12) is connected to a second connecting element of the primary side of the transformer (30).

6. The DC-DC voltage converter as claimed in claim 4, further comprising a secondary-side full bridge (20) which is arranged between a secondary side of the transformer (30) and a secondary-side DC voltage connection of the DC-DC voltage converter (1).

* * * * *